(12) United States Patent
Su

(10) Patent No.: US 8,353,170 B2
(45) Date of Patent: Jan. 15, 2013

(54) ABSORPTION HEAT PUMP SYSTEMS AND METHODS FOR IMPROVING ENERGY GRADE OF LOW TEMPERATURE WASTE HEAT

(75) Inventor: Qingquan Su, Beijing (CN)

(73) Assignee: Beijing Lianliyuan Technology Co., Ltd, Beijing (CN)

( * ) Notice: Subject to any disclaimer, the term of this patent is extended or adjusted under 35 U.S.C. 154(b) by 380 days.

(21) Appl. No.: 12/811,371

(22) PCT Filed: Jan. 8, 2009

(86) PCT No.: PCT/CN2009/000028
§ 371 (c)(1),
(2), (4) Date: Jun. 30, 2010

(87) PCT Pub. No.: WO2009/092281
PCT Pub. Date: Jul. 30, 2009

(65) Prior Publication Data
US 2011/0132008 A1    Jun. 9, 2011

(30) Foreign Application Priority Data
Jan. 8, 2008 (CN) .......................... 2008 1 0002335

(51) Int. Cl.
*F25D 15/00* (2006.01)

(52) U.S. Cl. ............................. 62/119; 62/476; 62/481

(58) Field of Classification Search .................. 62/119, 62/324.1, 476, 478, 481, 483, 513, 498, 477
See application file for complete search history.

(56) References Cited

U.S. PATENT DOCUMENTS

| | | | | | |
|---|---|---|---|---|---|
| 5,383,342 | A | * | 1/1995 | El-Boher et al. ................ | 62/532 |
| 5,526,648 | A | * | 6/1996 | Wertenbach et al. ........... | 62/101 |
| 5,617,733 | A | * | 4/1997 | Tomita et al. ................ | 62/324.2 |
| 5,732,569 | A | * | 3/1998 | Sanada et al. .................. | 62/481 |
| 5,916,258 | A | * | 6/1999 | Cho ............................. | 62/476 |
| 5,941,089 | A | * | 8/1999 | Takaishi et al. ............. | 62/324.2 |
| 6,128,917 | A | * | 10/2000 | Riesch et al. .................... | 62/476 |
| 6,263,696 | B1 | * | 7/2001 | Machizawa et al. ............ | 62/476 |
| 6,311,504 | B1 | * | 11/2001 | Yamazaki et al. .............. | 62/141 |
| 6,357,254 | B1 | * | 3/2002 | Xia ............................. | 62/476 |
| 6,550,272 | B2 | * | 4/2003 | Nakajima et al. .............. | 62/476 |
| 7,071,291 | B2 | * | 7/2006 | Thompson et al. ........... | 528/491 |
| 7,107,784 | B2 | * | 9/2006 | Beck ........................... | 62/324.2 |

* cited by examiner

*Primary Examiner* — Mohammad Ali
(74) *Attorney, Agent, or Firm* — Helen S. Liu

(57) ABSTRACT

An absorption heat pump system and a method for increasing the energy grade using the excess heat at a low temperature are provided. The absorption heat pump system comprises a heat pump generator (11), a heat pump condenser (12), a heat pump evaporator (13), a heat pump absorber (14), and an absorbent crystallizer (141). The absorbent crystallizer (141) has an inlet for the absorption solution, an outlet for the absorption solution and an outlet for the absorption solution containing absorbent crystals; The inlet for the absorption solution connects to the heat pump absorber (14), The outlet for the absorption solution connects to the heat pump generator (11), The outlet for the absorption solution containing absorbent crystals connects to the heat pump absorber (14). The absorption heat pump system can further comprise absorption refrigeration circulation subsystem, and the cooling medium produced by the refrigeration evaporator circulates between the refrigeration evaporator and the heat pump condenser. The method for increasing the energy grade using the heat at a low temperature utilizes the excess heat at a low temperature as driving heat source, and obtains the heat with high energy grade in the heat pump absorber (14).

13 Claims, 6 Drawing Sheets

ABSORPTION HEAT PUMP SYSTEMS AND METHODS FOR IMPROVING ENERGY GRADE OF LOW TEMPERATURE WASTE HEAT

CROSS REFERENCE TO RELATED APPLICATION

This application is a National Phase Application of international Application No. PCT/CN2009/000028, filed on Jan. 8, 2009, which claims priority to and the benefit of Chinese Patent Application Serial No. 200810002335.1, filed on Jan. 8, 2008. This application claims priority to and the benefit to each of the above two applications, each the disclosure of which is incorporated by reference in its entirety.

FIELD OF THE INVENTION

The present invention in general relates to absorption heat pump circulation technology in thermal power engineering field, and particularly to an absorption heat pump system and method for generating the high-grade heat energy using the excess heat at a low temperature.

BACKGROUND OF THE INVENTION

Excess heat utilization has an enormously potential space and is an effective way for energy-saving and emission-reduction in high power consumption industry fields, such as steel, chemistry, building materials, etc. Sources have it that energy loss in the manufacture process of integrated iron and steel works accounts for approximately 66 percent of the total input, wherein the excess heat occupies more than half of the total power consumption. On temperature basis, excess heat can be categorized into excess heat at a high temperature, an intermediate temperature and a low temperature. With the emphasis on excess heat utilization and perfection of the corresponding techniques, most of the excess heat with higher grade, such as high temperature flue gas and low heating value exhaust gas, has been effectively utilized. However, with regard to the excess heat at a low temperature and of low-grade, large-quantity and difficult reclamation (excess heat with temperature between 70° C.~250° C.), such as hot water with temperature between 70° C.~100° C., bled steam with temperature between 70° C.~105° C., flue gas with temperature between 70° C.~250° C. and so on, the R&D of the effective utilization technology remains to be accomplished.

An ideal way to utilize the excess heat at a low temperature is to convert it into high temperature heating medium such as useful steam in the manufacture process. The conversion techniques comprise second type of absorption heat pump technology. However, there is a problem of minor temperature rise, i.e., low pressure of the stream produced, for the second type of absorption heat pump circulation technology in prior art.

SUMMARY

It is the fundamental object of the present invention to overcome the existing problem of the second type of absorption heat pump circulation system in prior art which utilize the excess heat at a low temperature as driving heat source, to provide a system and method for increasing the energy grade of the excess heat at a low temperature on the principle of absorption circulation, and the technical problem solved is to make an absorber operate under the condition of higher absorbent concentration while to make a generator operate under the condition of lower absorbent concentration through the setting of absorbent crystallizer, and then, to set absorption refrigeration circulation subsystem to provide refrigeration capacity for condenser and absorbent crystallizer of the heat pump system, in order to convert the excess heat low temperature and of lower temperature into energy of higher grade, i.e. high temperature heating medium such as steam, so that it is more applicable and valuable in industry.

With the following technical solution, the object is achieved and the technical problem is solved. According to the present invention, an absorption heat pump system comprises a heat pump generator, a heat pump condenser, a heat pump evaporator and a heat pump absorber; and it further comprises an absorbent crystallizer, the absorbent crystallizer comprises an inlet for the absorption solution, an outlet for the absorption solution and an outlet for the absorption solution which contains absorbent crystals; the inlet for the absorption solution connects to the heat pump absorber, the output for the absorption solution connects to the heat pump generator, and the outlet for the absorption solution which contains absorbent crystals connects to the heat pump absorber.

With the following technical solution, the objective is further achieved and the technical problem is also solved. Preferably, the absorption heat pump system further comprises an absorption refrigeration circulation subsystem; the absorption refrigeration circulation subsystem is constituted of refrigeration generator, refrigeration condenser, refrigeration evaporator and refrigeration absorber; the heat exchanger of the refrigeration evaporator connects to the heat exchangers of the absorbent crystallizer as well as the heat pump condenser, to circulate the cooling medium produced by the refrigeration evaporator between refrigeration evaporator and heat pump condenser as well as absorbent crystallizer.

Preferably, the absorption heat pump system further comprises an absorption solution self heat exchanger, for heat exchanging between the absorption solution from the heat pump absorber and the absorption solution from the absorbent crystallizer.

Preferably, the absorption heat pump system further comprises an absorption solution self heat exchanger, for heat exchanging between the absorption solution from the heat pump absorber and the absorption solution containing absorbent crystals from the absorbent crystallizer.

Preferably, the absorption heat pump system further comprises an absorption solution self heat exchanger, for heat exchanging between the absorption solution from the heat pump absorber and the absorption solution containing absorbent crystals and also the absorption solution from the absorbent crystallizer.

Preferably, after the absorption heat pump system mixes the absorption solution from the heat pump generator and the absorption solution from the heat pump absorber, the mixture is led into the absorption solution self heat exchanger and exchange heat with the absorption solution from the absorbent crystallizer and the absorption solution containing absorbent crystals.

With the following technical solution as well, the objective is further achieved and the technical problem is also solved. According to the present invention, a method for increasing the energy grade using the excess heat at a low temperature is provided, which comprises: in the heat pump generator, utilizing the excess heat at a low temperature as driving heat source to concentrate absorption solution and producing steam, and then leading the steam into a heat pump condenser; in the heat pump condenser, utilizing cooling medium to convert the steam into condensation water; in a heat pump evaporator, utilizing the excess heat at a low temperature as heat source to evaporate the condensation water into steam; in a heat pump absorber, the absorption solution absorbing the steam from the evaporator and releasing heat, the absorption solution in the outlet of the heat pump absorber is led into an absorbent crystallizer, and the heating released in the absorption process being used to produce high temperature heating medium such as steam; in the absorbent crystallizer, the absorption solution from the heat pump absorber being crystallized and solid-liquid separated, the absorption solution after the solid-liquid separation is led into the heat pump generator to condense, and the absorption solution containing absorbent crystals after solid-liquid separation and absorption solution in the outlet of the heat pump generator is led into the heat pump absorber.

With the following technical solution, the object of this invention is further achieved and the technical problem is also solved.

Preferably, the method for increasing the energy grade using the excess heat at a low temperature further comprises: the absorption refrigeration circulation utilizing the excess heat at a low temperature as driving heat source, to provide the cooling capacity required for the heat pump condenser.

Preferably, the method for increasing the energy grade using the excess heat at a low temperature further comprises: utilizing steam compression circulation, to provide the cooling capacity required for the absorbent crystallizer of the heat pump subsystem.

Preferably, in the method for increasing the energy grade of the excess heat at a low temperature, the absorption solution containing absorbent crystals after solid-liquid separation first exchanges heat with the absorption solution from the heat pump absorber and then is led into the heat pump absorber.

Preferably, in the method for increasing the energy grade using the excess heat at a low temperature, the absorption solution after solid-liquid separation first exchanges heat with the absorption solution from the heat pump absorber and then is led into the heat pump generator.

Preferably, in the method for increasing the energy grade of the excess heat at a low temperature, after the excess heat is utilized, the temperature is no lower than 70° C.

Compared with the prior-art, the present invention has obvious advantages and beneficial effects. According to the technical solution above, a) In the case of applying the same excess heat at a low temperature as driving heat source, the temperature rise of the present invention, i.e. the difference between the temperature of the saturated steam produced and the temperature applied of the excess heat at a low temperature, is distinctly higher than known second type of absorption heat pump technology.
b) In the case of obtaining the equal temperature rise, the grade, i.e. the temperature of the applicable excess heat at a low temperature can be lower.

The description above is sole the summary of the technical solution of this invention. The preferred embodiments and detailed description with the accompanying drawings are set forth in this invention as below, to fully understand the technical solution of this invention and thereafter implement the solution according to the description.

DETAILED DESCRIPTION

Various preferred embodiments are now described with reference to the accompanying drawings. In the following description, for purposes of explanation, numerous specific details are set forth in order to provide a thorough understanding of the absorption heat pump system and its specific embodiment, structure, feature and functions.

Figure 1:
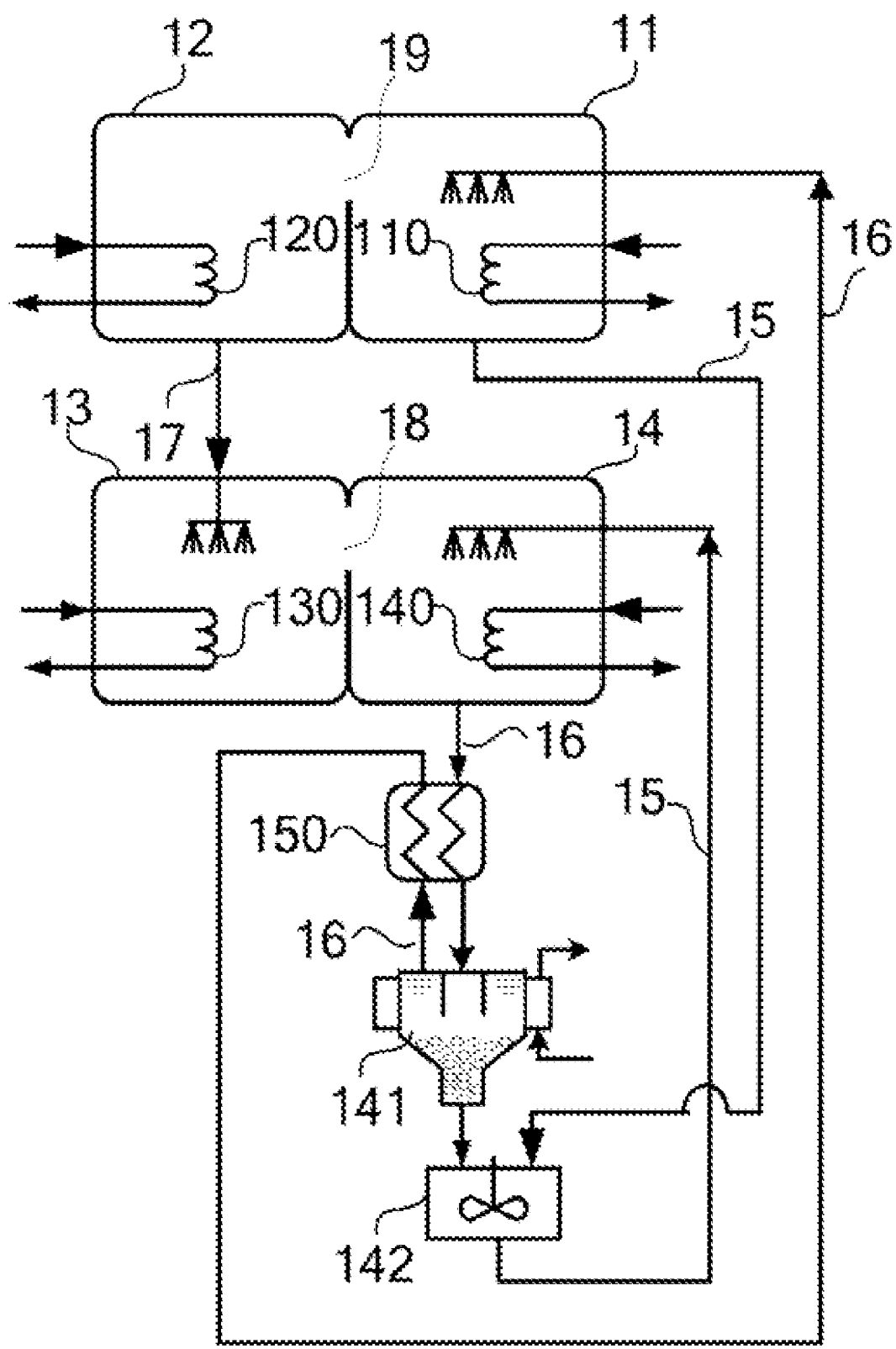
FIG. 1 illustrates a flow chart of an absorption heat pump according to a preferred embodiment of the present invention.

With reference to FIG. 1, a flow chart of the absorption heat pump system according to the first embodiment of the present invention is illustrated, the absorption heat pump circulation subsystem, comprises: a heat pump generator 11, a heat pump condenser 12, a heat pump evaporator 13 and a heat pump absorber 14, and absorption solution utilizing aqua-lithium bromide working medium pair. The heat pump generator 11 is configured to concentrate the absorption solution, which is provided with a heat exchanger 110 therein, feeding the excess heat at a low temperature to be utilized into the heat exchanger 110 to evaporate the water in the absorption solution, so as to increase the lithium bromide concentration of the absorption solution, the steam produced thereby enters into the heat pump condenser 12 via the steam passage 19. The absorption solution in the outlet of the heat pump generator 11 enters into the heat pump absorber 14 via the absorption solution pipeline 15, and the absorption solution in the outlet of the heat pump absorber 14 enters into the heat pump generator 11 via the absorption solution pipeline 16. The absorption solution is circulated between the heat pump generator 11 and the heat pump absorber 14 through the absorption solution pipelines 15 and 16. The heat pump condenser 12 is configured to condense the steam produced by the heat pump generator 11 to convert it into condensation water, which is provided with a heat exchanger 120 therein, feed the cooling medium into the heat exchanger 120 to absorb the condensation heat of the steam in the heat pump condenser 12 and to condense the steam into water, and the cooling medium flows out of the heat pump condenser 12 after its temperature is raised. The condensation water produced by the heat pump condenser 12 flows into the heat pump evaporator 13 via the condensation water pipeline 17. The heat pump evaporator 13 is configured to convert the condensation water from the heat pump condenser 12 into steam, which is provided with a heat exchanger 130, and feed the excess heat at a low temperature into heat exchanger 130 to evaporate the condensation water, the steam produced is led into the heat pump absorber 14 via the steam passage 18. The heat absorber 14 is configured to make the absorption solution absorbs steam and releases heat, which is provided with a heat exchanger 140, and feed the condensation water into the heat exchanger 140, the condensation water is heated to evaporate and produce saturated steam with a certain temperature, so as to realize the purpose of increasing the energy grade using the excess heat at a low temperature.

On the principle of absorption heat pump circulation, in the case that the temperature of the excess heat at a low temperature applied is constant, it is an effective way to further increase the concentration of the lithium bromide of absorption solution in the heat pump absorber so as to further increase the temperature of the high temperature heating medium such as the steam produced. Therefore, in the present embodiment, an absorption solution self heat exchanger 150, an absorbent crystallizer 141 and a mixer 142 are provided between the heat pump absorber 14 and heat pump generator 11, the absorption solution in the outlet of the heat pump absorber 14 enters into the absorbent crystallizer 141 via the absorption solution self heat exchanger 150, and in the absorbent crystallizer 141 the cooling medium of lower temperature cooling crystallizes the absorption solution, the precipitated absorbent crystals enters into the mixer 142 after gravity separation. The cooling medium utilized in the absorbent crystallizer can be from steam compression heat pump circulation system. Due to the precipitation of part of the absorbent, the concentration of the absorbent of the absorbent solution is decreased. The absorption solution with decreased absorbent concentration enters into heat pump generator 11 via the absorption solution pipeline 16 with the absorption solution self heat exchanger 150. The absorption solution self heat exchanger 150 aims to exchanging heat between the absorption solution with higher temperature from the heat pump absorber 14 and the absorption solution with lower temperature from the absorbent crystallizer, so as to increase the temperature of the absorption solution provided to the heat pump generator 11 and decrease the temperature of the absorption solution provided to the absorbent crystallizer. On the principle of absorption heat pump circulation, in the case that the temperature of the excess heat at a low temperature utilized is constant, it is an effective way to decrease the concentration of the lithium bromide of the absorption solution in the heat generator to facilitate the evaporation of the water in absorption solution in the heat pump generator, i.e. enhance the capacity of the heat pump generator. Due to the concentration in the heat pump generator 11, absorption solution with increased concentration of the lithium bromide in the outlet of the heat pump generator 11 is led into the mixer 142 firstly to completely or partially dissolve the absorbent crystals from the absorbent crystallizer 141, and then is led into the heat pump absorber 14. In the present invention, the operation concentration of the lithium bromide of the absorption solution in the heat pump absorber 14 and heat pump generator 11 can be set and optimized individually. In another words, the present invention can realize an extremely beneficial technological condition for absorption heat pump circulation, i.e., the heat pump absorber operates under the condition of high concentration of the lithium bromide, while the heat pump generator operates under that condition of lower concentration of the lithium bromide than the heat pump absorber operating condition, which the traditional absorption heat pump circulation can hardly achieve.

Figure 2:
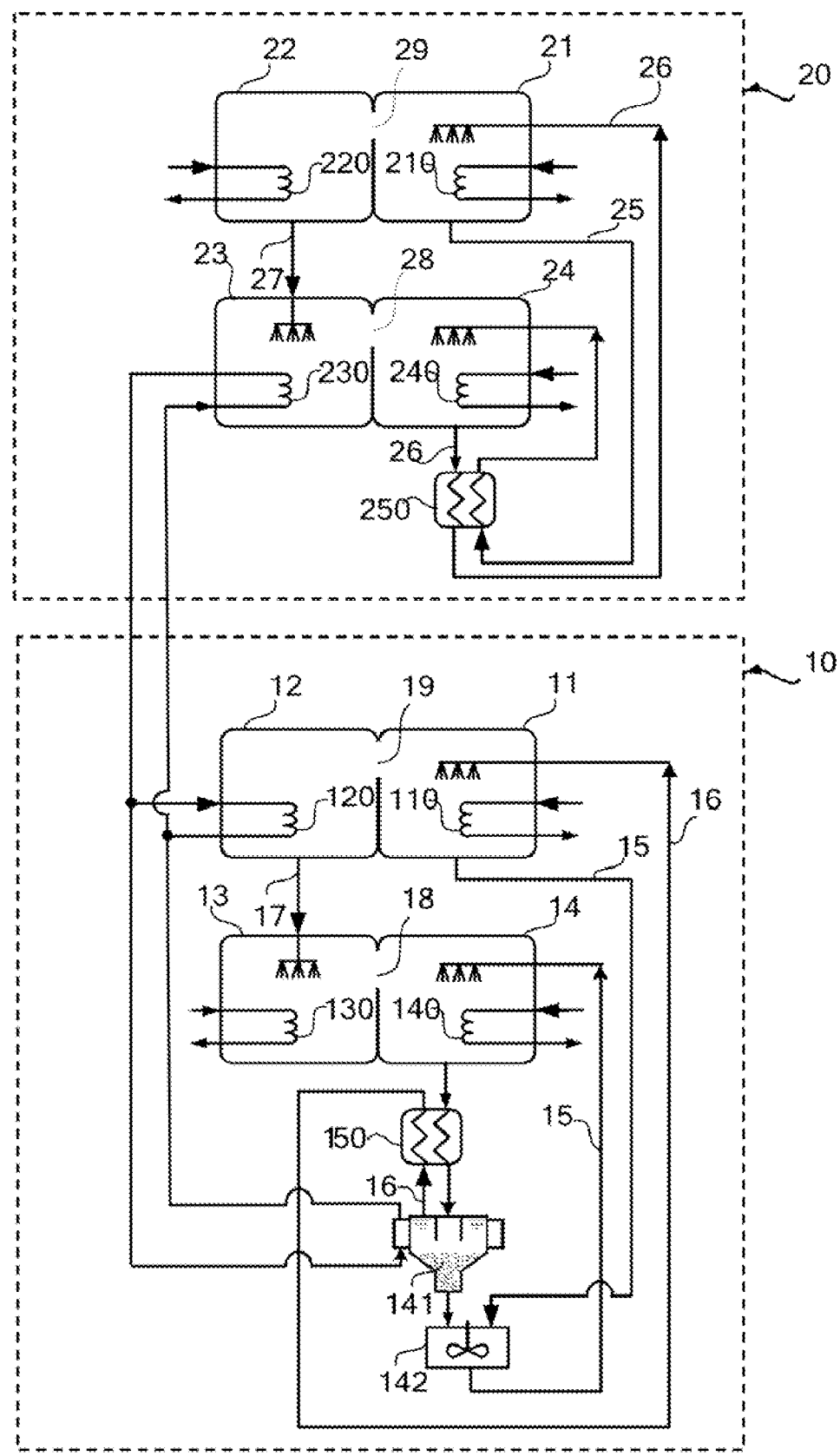
FIG. 2 illustrates a flow chart of an absorption heat pump according to another preferred embodiment of the present invention.

With reference to FIG. 2, a flow chart of the absorption heat pump system according to the second embodiment of the present invention, and the system comprises absorption heat pump circulation subsystem 10 and absorption refrigeration circulation subsystem 20. The absorption heat pump circulation subsystem 10 is essentially the same as the absorption heat pump circulation subsystem of the first embodiment, and the absorption refrigeration circulation subsystem 20 comprises: refrigeration generator 21, refrigeration condenser 22, refrigeration evaporator 23 and refrigeration absorber 24, and absorption solution utilizing aqua-lithium bromide working medium pair. Refrigeration generator 21 is configured to concentrate absorption solution, which is provided with a heat exchanger 210 therein, feed the heat source at a low temperature into the heat exchanger 110 to evaporate the water in the absorption solution, so as to increase the lithium bromide concentration of the absorption solution. The steam produced thereby enters into the refrigeration condenser 22 via the steam passage 29. The absorption solution in the outlet of the refrigeration generator 21 enters into the refrigeration absorber 24 via the absorption solution pipeline 25, and the absorption solution in the refrigeration absorber 24 enters into the refrigeration generator 21 via the absorption solution pipeline 26. The absorption solution is circulated between the refrigeration generator 21 and the refrigeration absorber 24 through the absorption solution pipeline 25 and 26. A absorption solution self heat exchanger 250 is provided on the circulation route of the absorption solution pipeline 25 and 26 to decrease the temperature of the absorption solution entering into the refrigeration generator 21 and increase the temperature of the absorption solution entering into the refrigeration absorber 24. The refrigeration condenser 22 is configured to condense the steam produced by the refrigeration generator 21, which is provided with a heat exchanger 220 therein, feed the cooling water at a lower temperature into the heat exchanger 220 to absorb the condensation heat of the steam in the refrigeration condenser 22 and to condense the steam into water, and the water flows out of the refrigeration condenser 22 after its temperature is raised. The condensation water produced by the refrigeration condenser 22 is delivered into the refrigeration evaporator 23 via the condensation water pipeline 27. The refrigeration evaporator 23 is configured to convert the condensation water from the refrigeration condenser 22 into steam while to output refrigerating capacity to the cooling medium from the condenser of the heat pump circulation subsystem described above, which is provided with a heat exchanger 230, and feed the cooling medium from the condenser of the heat pump circulation subsystem described above into the heat exchanger 230 to evaporate the condensation water, and the steam returns to the condenser of the heat pump circulation subsystem described above after the temperature is decreased. The steam produced by the refrigeration evaporator 23 enters into the refrigeration absorber 24 via the steam passage 28. The refrigeration absorber 24 is configured to make the absorption solution absorb steam and release heat, which is provided with a heat exchanger 240, and feed the condensation water at a lower temperature into the heat exchanger 240 to absorb the absorption heat of the refrigeration absorber 24, so as to keep the temperature of the absorption solution of the refrigeration absorber 24 constant.

The heat exchanger 230 in the refrigeration evaporator 23 and the heat exchanger 120 described above in the heat pump condenser 12 described above are connected to form a circulation loop, i.e. the outlet of the heat exchanger 230 connects to the inlet of the heat exchanger 120 and outlet of the heat exchanger 120 connects to the inlet of the heat exchanger 230, so that the refrigerating capacity produced by the absorption refrigeration circulation subsystem 20 is provided to the absorption heat pump circulation subsystem 10 for utilization. Preferably, a part flow arrangement can be provided in the circulation loop formed by the heat exchanger 230 and heat exchanger 120, to split part of the cooling medium outputted from the heat exchanger 230 to the absorbent crystallizer of the heat pump circulation subsystem, to provide refrigerating capacity thereto for crystallizing lithium bromide solution, the cooling medium from the absorbent crystallizer returns to the inlet of the heat exchanger 230. According to the present invention, with the refrigeration circulation subsystem with the same low temperature heat source as the driving heat source to decrease the operation temperature of the heat pump condenser 12 and the absorbent crystallizer, so as to realize the effect that the excess heat of lower temperature can be utilized under the condition of obtaining the same temperature rise.

Figure 6:
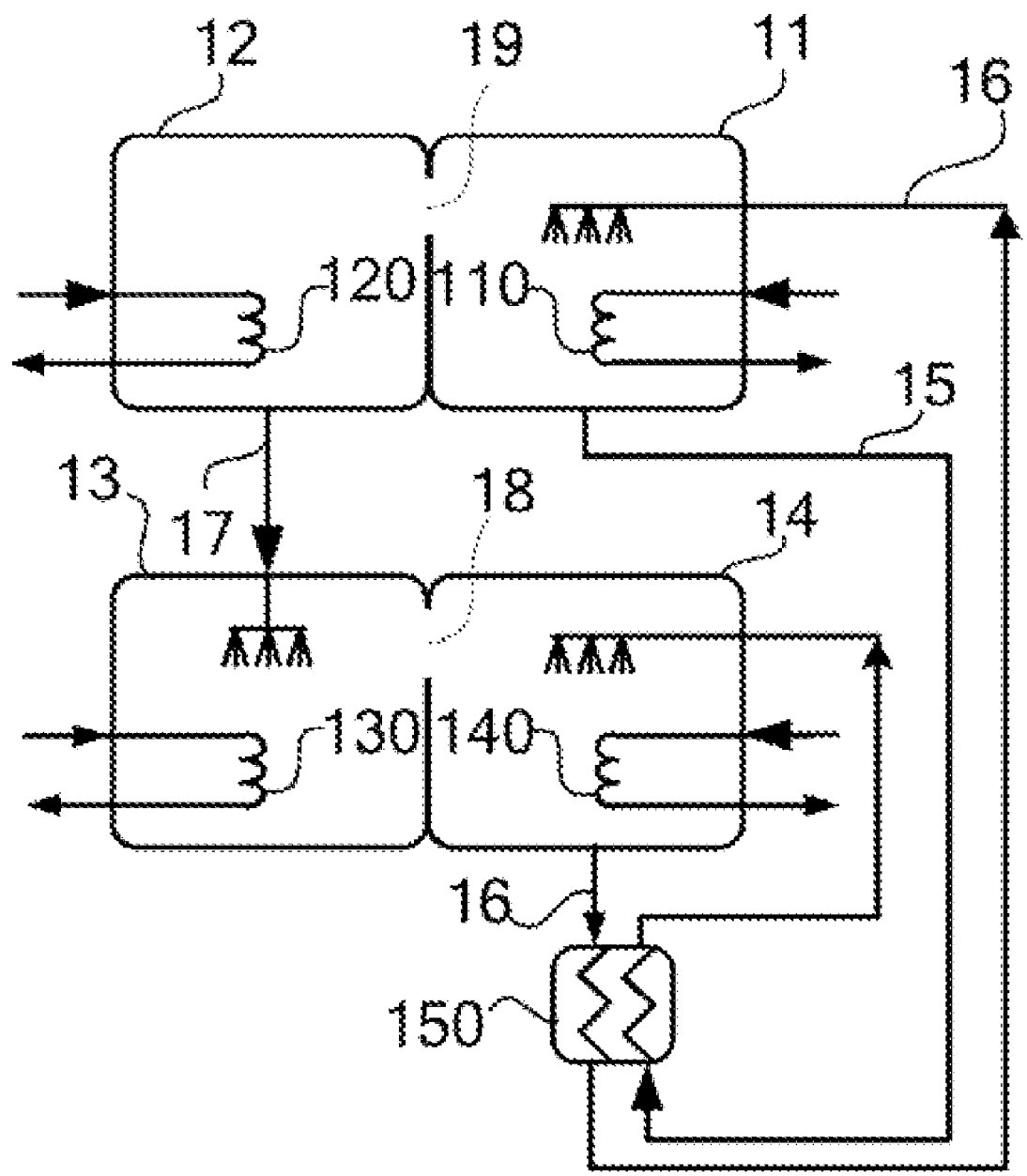
FIG. 6 illustrates a flow chart of comparative embodiment.
10: absorption heat pump circulation subsystem
11: heat pump generator
12: heat pump condenser
13: heat pump evaporator
14: heat pump absorber
15 and 16: absorption solution pipeline
17: condensation water pipeline
18 and 19: steam passage
110, 120, 130 and 140: heat exchanger
141: absorbent crystallizer
142: mixer
20: absorption refrigeration circulation subsystem
21: refrigeration generator
22: refrigeration condenser
23: refrigeration evaporator
24: refrigeration absorber
25 and 26: absorption solution pipeline
27: condensation water pipeline
28 and 29: steam passage
210, 220, 230 and 240: heat exchanger
150 and 250: absorption solution self heat exchanger

With reference to FIG. 6, a flow chart of the known second type of the absorption heat pump is illustrated. Since the systems and methods of the known second type of the absorption heat pump is a prior art, so the corresponding details are omitted.

The type of the absorption solution employed by the technical solution according to the present invention are not particularly limited, and the embodiments described above are illustrated by the example of absorption solution with aqua-lithium bromide working medium pair, and one of or mixture of several ones of LiBr, LiCl, LiNO$_3$, NaBr, KBr, CaCl$_2$, MgBr$_2$, and so on can be employed as the absorption solution of the absorbent.

Figure 3:
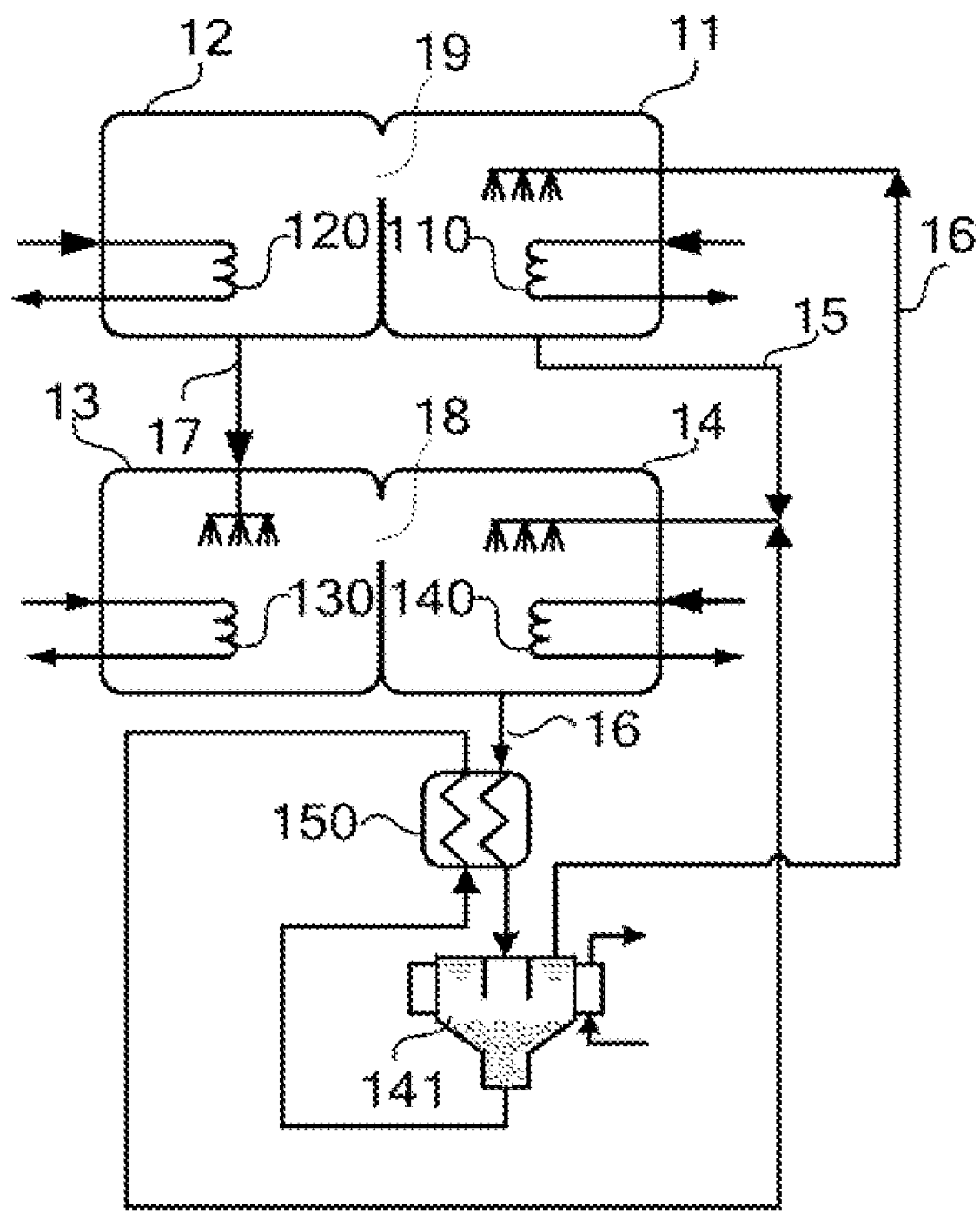
FIG. 3 illustrates a flow chart of another preferred embodiment of the present invention.
Figure 4:
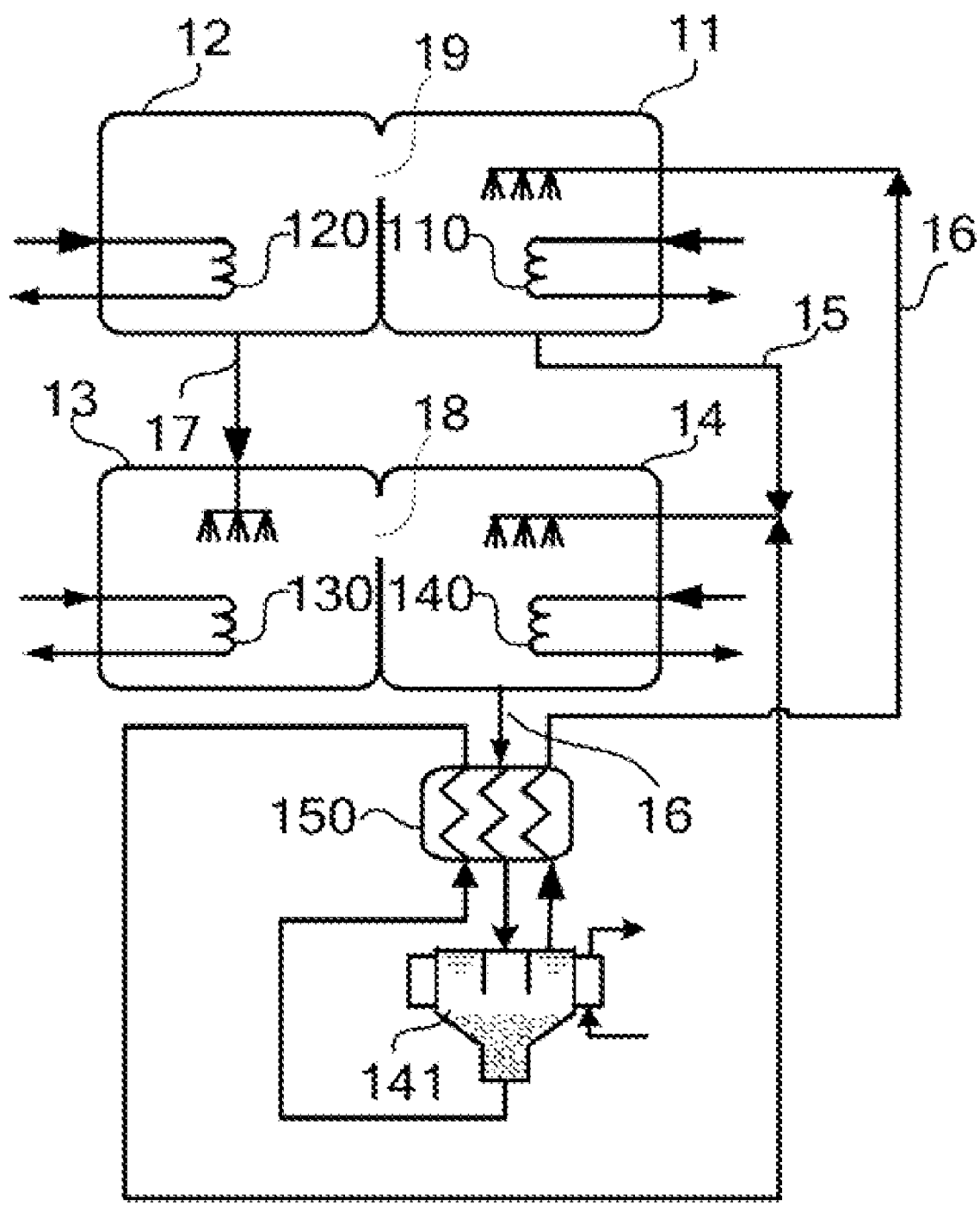
FIG. 4 illustrates a flow chart of another preferred embodiment of the present invention.

With reference to FIG. 3, preferably, feed the absorption solution containing absorbent crystals produced by the absorbent crystallizer into the absorption solution self heat exchanger to exchange heat, and then is mixed with the absorption solution from the heat pump generator, and then is delivered to the heat pump absorber. Meanwhile, the mixture is an optional device, which can be provided or not. The temperature of the absorption solution comprising absorbent crystals is increased due to the heat exchanging, it is beneficial for the dissolution of the absorbent crystals, and meanwhile the temperature of the absorption solution entering in the absorbent crystallizer is further decreased, so as to reduce the demand of the absorbent crystallizer for cooling medium. Furthermore, as shown in FIG. 4, also feed the absorbent solution produced by the absorbent crystallizer into the absorption solution self heat exchanger after solid-liquid separation and is led into the heat pump generator after heat exchanging with the absorption solution from the heat pump absorber, so as to increase the temperature of the absorption solution entering into the heat pump generator while facilitate to further decrease the temperature of the absorption solution entering into the absorbent crystallizer, therefore it is more beneficial to effectively utilize the heat energy.

Figure 5:
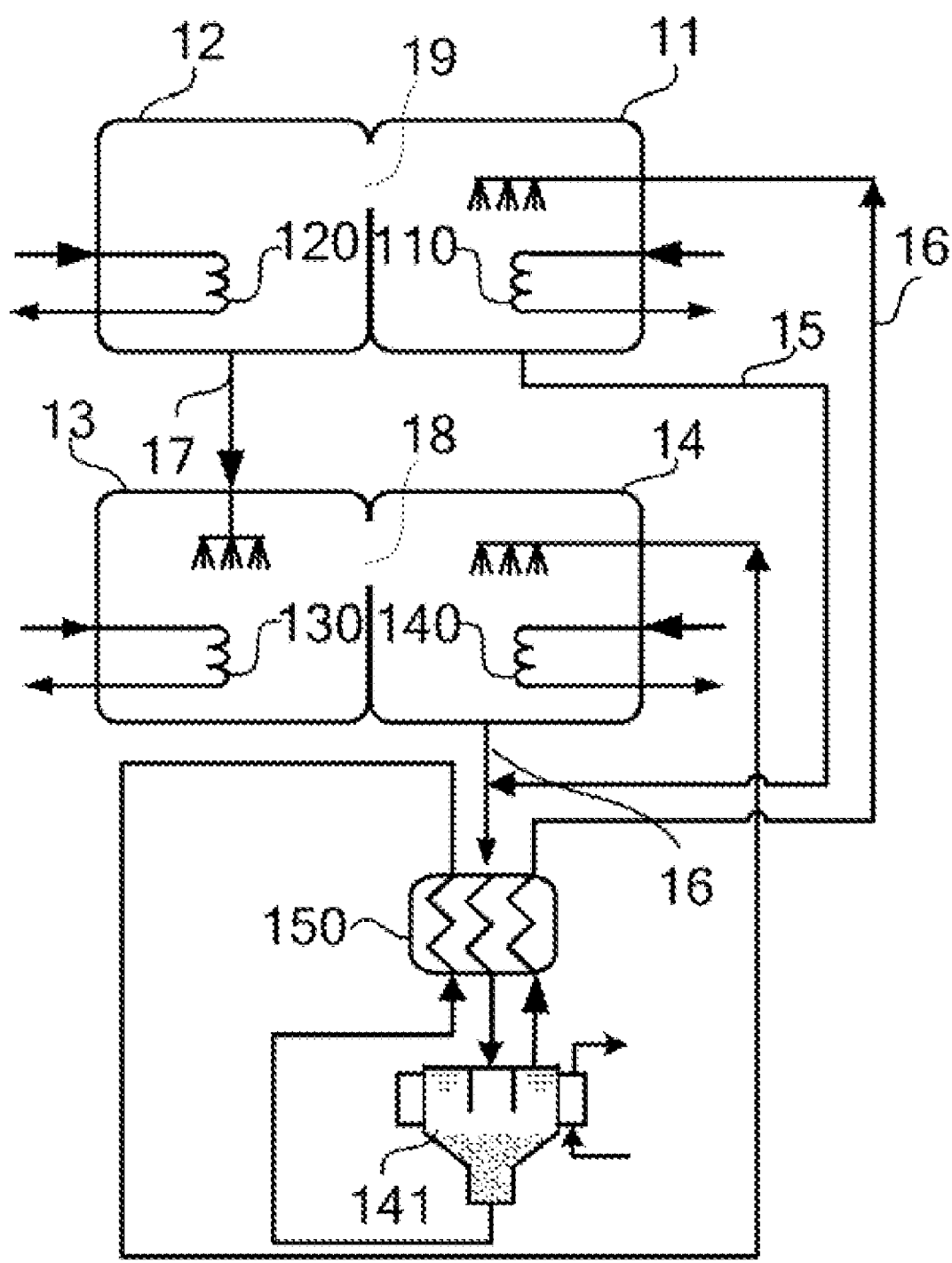
FIG. 5 illustrates a flow chart of another preferred embodiment of the present invention.

With reference to FIG. 5, in the absorption heat pump system of the embodiments described above, preferably, the absorption solution pipeline for outputting the absorption solution in the heat pump generator can be connected with the absorption solution pipeline for outputting absorption solution in the heat pump absorber, so that the absorption solution from the heat pump generator and the absorption solution from the heat pump absorber are mixed. The mixed absorption solution enters into the absorption solution self heat exchanger, to utilize heat energy to exchange heat with the absorption solution at a lower temperature from the absorbent crystallizer more effectively, so as to increase the temperature of the absorption solution entering into the heat pump generator and also further decrease the temperature of the absorption solution provided to absorbent crystallizer, and meanwhile the mixer can be omitted. Furthermore, the absorption solution containing the absorbent crystals produced by the absorbent crystallizer can be firstly delivered to the absorption solution self heat exchanger to exchange heat and then is delivered to the heat pump absorber, so as to further increase the temperature of the absorption solution entering the heat pump absorber while decrease the temperature of the absorption solution provided to the absorbent crystallizer, to achieve the purpose of better utilization of heating capacity and cooling capacity.

According to the present invention, the third embodiment also provides a method to increase energy grade using the excess heat at a low temperature, which utilizes the absorption heat pump system as described in the first embodiment described above, the method essentially comprises: utilize the excess heat at a low temperature as driving heat source concentration absorption solution to produce steam and meanwhile concentrate absorption solution, and then the steam is led into the heat pump condenser; utilizing cooling medium to condense the steam produced by the heat pump generator into condensation water in the heat pump condenser; utilizing the excess heat at a low temperature as heat source to evaporate the condensation water produced by the heat pump condenser into steam; in a heat absorber, the absorption solution absorbs steam from the heat pump evaporator and releases heat to produce high temperature heating medium such as steam in the heat exchanger of the heat pump absorber while the concentration of the absorption solution decreases. The absorption solution in the outlet of the heat pump absorber is led into the absorbent crystallizer, and in the absorbent crystallizer, the absorption solution is crystallized and solid-liquid separated, the absorption solution after the solid-liquid separation is led into the heat pump generator to condense, and the absorption solution containing absorbent crystals after solid-liquid separation and the absorption solution in the outlet of the heat pump generator are mixed and is led into the heat pump absorber. Preferably, heat is exchanged between the absorption solution in the outlet of the heat pump absorber and the absorption solution in the outlet of the absorbent crystallizer. The beneficial effects of the present invention are, the concentration of the lithium bromide in the heat pump absorber is significantly increased due to the absorbent crystallization process in the method, so that it is simply to feed the excess heat into the heat pump generator and heat pump evaporator to obtain heat quantity of high grade, i.e. saturated steam of relatively higher temperature, in the heat pump absorber.

The fourth embodiment according to the present invention also provides a method for increasing the energy grade using the excess heat at a low temperature, which utilizes the absorption heat pump system as described in the second embodiment described above, and compared with the method of the third embodiment, a refrigeration circulation process is added, to provide cooling medium at a lower temperature for the heat pump condenser and the absorbent crystallizer for the heat pump circulation. The method according to the present embodiment comprises an absorption heat pump circulation and an absorption refrigeration circulation, the absorption refrigeration circulation utilizes the excess heat at a low temperature as driving heat source, to provide the cooling capacity required for the heat pump condenser and the absorbent crystallizer of the absorption heat pump circulation described above. The specific process of the absorption heat pump circulation is the same as the process according to the third embodiment described above; prior art is utilized in the absorption refrigeration circulation.

The fifth embodiment according to the present invention also provides a method for increasing the energy grade using excess heat at a low temperature, which utilizes the absorption heat pump system of the first embodiment described above. The method of the present embodiment comprises absorption heat pump circulation and steam compression refrigeration circulation, the steam compression refrigeration circulation provides cooling capacity required for the absorbent crystallizer of the absorption heat pump circulation. The specific circulation process of the absorption heat pump circulation is the same as the process of the third embodiment described above, prior art is utilized in the steam compression refrigeration circulation. Systems and methods for current steam compression refrigeration circulation are common knowledge, which are omitted herein.

Preferably, after utilization, the excess heat at a low temperature in the fourth and fifth embodiment described above is no lower than 70° C.

Hereinafter, embodiments with specific parameters are illustrated to present the practicability of the embodiments mentioned above.

Sixth Embodiment

The present embodiment utilizes the method of the third embodiment, to upgrade the excess heat at a low temperature of 100° C. to the saturated steam of 185° C. The present embodiment utilizes condensation water of 32° C. to condense the heat pump condenser 12 and the absorbent crystallizer 141.

Seventh Embodiment

The present embodiment utilizes the method of the fourth embodiment, to upgrade the excess heat at a low temperature of 75° C. to the saturated steam of 150° C. The present embodiment utilizes condensation water of 32° C. to condense the refrigeration condenser 22 and the refrigeration absorber 24 of the absorption refrigeration subsystem 20, and utilizes the cooling medium outputted by the absorption refrigeration subsystem 20 to condense the heat pump condenser 12 and the absorbent crystallizer 141 of the heat pump circulation subsystem 10.

Eighth Embodiment

The present embodiment utilizes the method of the fifth embodiment, to upgrade the excess heat at a low temperature of 90° C. to the saturated steam of 170° C. The present embodiment utilizes condensation water of 32° C. to condense the heat pump condenser of the heat pump circulation subsystem, and utilizes the cooling capacity produced by the steam compression refrigeration circulation to condense the absorbent crystallizer of the heat pump circulation subsystem.

Comparison Embodiment

The present comparison embodiment utilizes the current second type of the heat pump circulation system, to upgrade the excess heat at a low temperature of 100° C. to saturated steam of 150° C. The condensation water utilized by the present comparison embodiment is the same as the above sixth embodiment.

The following Table 1 illustrates the operation parameters and performance of the embodiments and comparison embodiments described above.

TABLE 1

| | | | Sixth Embodiment | Seventh Embodiment | Eighth Embodiment | Comparison |
|---|---|---|---|---|---|---|
| Absorption Heat Pump Circulation Subsystem | Heat Pump Generator | Temperature of the excess heat at a low temperature in the inlet of the heat exchanger (° C.) | 100 | 75 | 90 | 100 |
| | | Temperature of the excess heat at a low temperature in the outlet of the heat exchanger, i.e. temperature of the excess heat at a low temperature after utilization (° C.) | 95 | 70 | 85 | 95 |
| | | Lithium bromide concentration of the inlet (wt %) | 62.5 | 60.0 | 58.0 | 62.5 |
| | | Lithium bromide concentration of the outlet (wt %) | 65.5 | 63.0 | 61.0 | 65.5 |
| | | Pressure (kPa) | 6.1 | 2.4 | 6.1 | 6.1 |
| | Heat Pump Condenser | Temperature of cooling medium in the inlet of the heat exchanger (° C.) | 32 | 15 | 32 | 32 |
| | | Temperature of cooling medium in the outlet of the heat exchanger (° C.) | 35 | 18 | 35 | 35 |
| | | Pressure (kPa) | 6.0 | 2.3 | 6.0 | 6.0 |

TABLE 1-continued

|  |  |  | Sixth Embodiment | Seventh Embodiment | Eighth Embodiment | Comparison |
|---|---|---|---|---|---|---|
|  | Heat Pump Evaporator | Temperature of the excess heat at a low temperature in the inlet of the heat exchanger (° C.) | 100 | 75 | 90 | 100 |
|  |  | Temperature of the excess heat at a low temperature in the outlet of the heat exchanger, i.e. temperature of the excess heat at a low temperature after utilization (° C.) | 95 | 70 | 85 | 95 |
|  |  | Pressure (kPa) | 82.4 | 30.0 | 56.0 | 82.4 |
|  | Heat Pump Absorber | Temperature of the condensation water in the inlet of the heat exchanger (° C.) | 100 | 75 | 90 | 100 |
|  |  | Temperature of the condense water in the outlet of the heat exchanger, i.e. temperature of the excess heat at a low temperature after utilization (° C.) | 185 | 150 | 170 | 150 |
|  |  | Lithium bromide concentration of the inlet (wt %) | 75.0 | 75.0 | 75.0 | 65.5 |
|  |  | Lithium bromide concentration of the outlet (wt %) | 72.0 | 72.0 | 72.0 | 62.5 |
|  |  | Pressure (kPa) | 82.3 | 29.9 | 55.9 | 82.3 |
|  | Crystallizer | Temperature of lithium bromide precipitation (° C.) | 37 | 19 | 4 | — |
| Absorption Refrigeration Circulation Subsystem | Refrigeration Generator | Temperature of the excess heat at a low temperature in the inlet of the heat exchanger (° C.) | — | 75 | — | — |
|  |  | Temperature of the excess heat at a low temperature in the outlet of the heat exchanger, i.e. temperature of the excess heat at a low temperature after utilization (° C.) | — | 70 | — | — |
|  |  | Lithium bromide concentration of the inlet (wt %) | — | 50.0 | — | — |
|  |  | Lithium bromide concentration of the outlet (wt %) | — | 53.0 | — | — |
|  |  | Pressure (kPa) | — | 6.5 | — | — |
|  | Refrigeration Condenser | Temperature of the condensation water in the inlet of the heat exchanger (° C.) | — | 32 | — | — |
|  |  | Temperature of the condensation water in the outlet of the heat exchanger, i.e. temperature of the excess heat at a low temperature after utilization (° C.) | — | 35 | — | — |
|  |  | Pressure (kPa) | — | 6.4 | — | — |

TABLE 1-continued

| | | Sixth Embodiment | Seventh Embodiment | Eighth Embodiment | Comparison |
|---|---|---|---|---|---|
| Refrigeration Evaporator | Temperature of the cooling medium in the inlet of the heat exchanger (° C.) | — | 18 | — | — |
| | Temperature of the cooling medium in the outlet of the heat exchanger, i.e. temperature of the excess heat at a low temperature after utilization (° C.) | — | 15 | — | — |
| | Pressure (kPa) | — | 1.7 | — | — |
| Refrigeration Absorber | Temperature of the condensation water in the inlet of the heat exchanger (° C.) | — | 32 | — | — |
| | Temperature of the condensation water in the outlet of the heat exchanger, i.e. temperature of the excess heat at a low temperature after utilization (° C.) | — | 35 | — | — |
| | Lithium bromide concentration of inlet (wt %) | — | 53.0 | — | — |
| | Lithium bromide concentration of the outlet (wt %) | — | 50.0 | — | — |
| | Pressure (kPa) | — | 1.6 | — | — |

The source of the excess heat at a low temperature in the sixth, seventh and eighth embodiments described above is from the excess heat of 75° C.~250° C., such as hot water of 75° C.~100° C., bled steam of 75° C.~105° C., flue gas of 75° C.~250° C. and so on. According to the different sources of the heat sources at low temperatures, the temperature of the heat source at low temperatures are different, which results in more embodiments, and since the processes of the more embodiments are the same as the process of the embodiments described above, in the light of the embodiments described above, the skilled in the art can set the specific process parameters and achieve the identical technical effect with that of the present invention, which is omitted herein.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

INDUSTRIAL APPLICATION

In the case that the same excess heat at a low temperature is utilized, the temperature rise of the present invention, i.e. the difference between the temperature of the produced saturated steam and the temperature of the excess heat at a low temperature is significantly higher than the current technology of the second type of the absorption heat pump. In the case of obtaining the same temperature rise, the temperature, i.e. the grade using the excess heat at a low temperature that can be utilized can be decreased.

What is claimed is:

1. An absorption heat pump system comprising a heat pump generator, a heat pump condenser, a heat pump evaporator, a heat pump absorber, an absorbent crystallizer, an absorption solution, and absorbent crystals;
    wherein the absorbent crystallizer comprises an inlet for the absorption solution, an outlet for the absorption solution and an outlet for the absorption solution containing the absorbent crystals;
    the inlet for the absorption solution is connected to the heat pump absorber, the outlet for the absorption solution is connected to the heat pump generator, and the outlet for the absorption solution containing absorbent crystals is connected to the heat pump absorber.

2. The absorption heat pump system of claim 1 further comprising an absorption refrigeration circulation subsystem;
    wherein the absorption refrigeration circulation subsystem comprises a refrigeration generator, a refrigeration condenser, a refrigeration evaporator and a refrigeration absorber;
    wherein the refrigeration evaporator comprises a heat exchanger, the absorbent crystallizer comprises a heat exchanger, and the heat pump condenser comprises a heat exchanger; and
    wherein the heat exchanger of the refrigeration evaporator is connected with the heat exchangers of the absorbent crystallizer, and the heat exchanger of the refrigeration evaporator is connected with the heat exchanger of the heat pump condenser.

3. The absorption heat pump system of claim 1 further comprising an absorption solution self heat exchanger, for heat exchanging between the absorption solution from the heat pump absorber and the absorption solution from the absorbent crystallizer.

4. The absorption heat pump system of claim 1 further comprising an absorption solution self heat exchanger, for heat exchanging between the absorption solution from the heat pump absorber and the absorption solution containing absorbent crystals from the absorbent crystallizer.

5. The absorption heat pump system of claim 1 further comprising an absorption solution self heat exchanger, for heat exchanging between the absorption solution from the heat pump absorber and the absorption solution containing absorbent crystals and the absorption solution from the absorbent crystallizer.

6. The absorption heat pump system of claim 5, wherein after the absorption solution of the heat pump generator and the absorption solution of the heat pump absorber are mixed to form a mixture, the mixture enters into the absorption solution heat exchanger and exchanges heat with the absorption solution from the absorbent crystallizer and the absorption solution containing absorbent crystals.

7. A method for using the excess heat at a low temperature comprising:
  in a heat pump generator, utilizing the excess heat at a low temperature to concentrate an absorption solution and produce steam, and the steam being led to a heat pump condenser;
  in the heat pump condenser, utilizing a cooling medium to convert the steam into condensation water;
  in a heat pump evaporator, utilizing the excess heat at a low temperature to evaporate the condensation water into steam;
  in a heat pump absorber, absorbing steam from the evaporator by the absorption solution, thereby releasing heat, wherein the absorption solution in the outlet of a heat pump absorber is led into an absorbent crystallizer, and the heat releasing in the absorption process is used to produce a high temperature heating medium;
  in the absorbent crystallizer, allowing the absorption solution comprising a solid and a liquid from the heat pump absorber to crystallize and the solid to separate from the liquid, wherein the absorption solution after the solid-liquid separation is led into the heat pump generator to condense, and the absorption solution containing absorbent crystals after solid-liquid separation and the absorption solution in the outlet of the heat pump generator is led into the heat pump absorber.

8. The method of claim 7 comprising:
  utilizing the excess heat at a low temperature an absorption refrigeration circulation to provide the cooling capacity required for the heat pump condenser and the absorbent crystallizer.

9. The method of claim 7, comprising:
  utilizing a steam compression refrigeration circulation to provide the cooling capacity required for the absorbent crystallizer.

10. The method of claim 8, wherein the temperature of the excess heat at a low temperature is no lower than 70° C. after utilization.

11. The method of claim 7, wherein the absorption solution containing the absorbent crystals after the solid-liquid separation exchanges heat with the absorption solution from the heat pump absorber and is led into the heat pump absorber.

12. The method of claim 7, wherein the absorption solution after solid-liquid separation exchanges heat with the absorption solution from the heat pump absorber and then is led into the heat pump generator.

13. The method of claim 9, wherein the temperature of the excess heat at a low temperature is no lower than 70° C. after utilization.

\* \* \* \* \*